United States Patent
Akamatsu et al.

(10) Patent No.: US 6,508,314 B2
(45) Date of Patent: Jan. 21, 2003

(54) AUTOMATIC TOOL CHANGER

(75) Inventors: Yoshiaki Akamatsu, Yamatokoriyama (JP); Makoto Fujishima, Yamatokoriyama (JP)

(73) Assignees: Mori Seiki Co., Ltd., Yamatokoriyama (JP); Intelligent Manufacturing Systems International, Sacramento, CA (US)

( * ) Notice: Subject to any disclaimer, the term of this patent is extended or adjusted under 35 U.S.C. 154(b) by 64 days.

(21) Appl. No.: 09/849,268

(22) Filed: May 7, 2001

(65) Prior Publication Data

US 2001/0037888 A1 Nov. 8, 2001

(30) Foreign Application Priority Data

May 8, 2000 (JP) .......................................... 2000-134620

(51) Int. Cl.[7] ................................................ B23Q 3/157
(52) U.S. Cl. ............................ 173/2; 173/213; 173/217; 173/171
(58) Field of Search .................. 173/2, 4, 217, 173/213, 171, 178, 148, 181, 20; 340/680; 364/508

(56) References Cited

U.S. PATENT DOCUMENTS

| | | | | |
|---|---|---|---|---|
| 3,898,911 A | * | 8/1975 | DeCaussin | 173/213 |
| 3,958,494 A | * | 5/1976 | Miller | 173/2 |
| 4,077,736 A | * | 3/1978 | Hutchens | 173/217 |
| 5,154,242 A | * | 10/1992 | Soshin et al. | 173/178 |
| 5,170,358 A | * | 12/1992 | Delio | 364/508 |
| 5,277,261 A | * | 1/1994 | Sakoh | 173/20 |
| 5,782,158 A | * | 7/1998 | Rothering | 173/2 |
| 6,055,484 A | * | 4/2000 | Lysaght | 173/181 |
| 6,114,965 A | * | 9/2000 | Schoch | 340/680 |

FOREIGN PATENT DOCUMENTS

| | | |
|---|---|---|
| JP | 60-213454 | 10/1985 |
| JP | 9-057581 | 3/1997 |

* cited by examiner

Primary Examiner—Scott A. Smith
(74) Attorney, Agent, or Firm—Armstrong, Westerman & Hattori, LLP

(57) ABSTRACT

The present invention provides an automatic tool changer which is adapted to detect the end of the service life of a bearing of a cam follower for systematic replacement of the bearing. The automatic tool changer comprises: a tool changer mechanism (26) including a rotation shaft, a changer arm fixed to the rotation shaft, a cam follower attached to the rotation shaft and having an engagement roller rotatably supported by a bearing, a cam engaged with the engagement roller of the cam follower, and drive for driving the cam; and a controlling section (57) for controlling an operation of the tool changer mechanism (26). The tool changer further comprises a service life end detecting section (9) for counting the number of times of the operation performed by the tool changer mechanism (26) and judging whether or not the count of the number reaches a reference operation number serving as a basis for the detection of the end of the service life of the bearing. With this arrangement, maintenance can systematically be carried out by detecting the end of the service life of the bearing of the cam follower.

3 Claims, 5 Drawing Sheets

AUTOMATIC TOOL CHANGER

BACKGROUND OF THE INVENTION

1. Field of the Invention

The present invention relates to an automatic tool changer for a machine tool and, more particularly, to an automatic tool changer which is adapted to rotate a changer arm by engagement of a cam and cam followers.

2. Description of the Prior Art

One exemplary machine tool having an automatic tool changer of the aforesaid type will be explained with reference to FIGS. 3 to 5. The machine tool 12 illustrated in FIG. 3 is a so-called vertical machining center. The machine tool 12 includes: a bed 13; a column 14 provided upright on the bed 13; a spindle head 15 supported by the column 14 in a vertically movable manner; a spindle 16 supported by the spindle head 15 and rotatable about an axis thereof; a table 17 provided below the spindle 16 on the bed 13; a tool magazine 21 provided on the left side of the spindle head 15; a tool changer mechanism 26 provided at a lower end of the tool magazine 21 for exchanging a tool T attached to the spindle 16 with a tool T stored in a retainer pot 23 of the tool magazine 21; and a numerical controller 50 as shown in FIG. 5 for controlling the respective components of the machine tool.

The tool magazine 21 includes: a plurality of retainer pots 23 for retaining tool holders TH; a retainer disk plate 24 for retaining the retainer pots 23 at a predetermined interval circumferentially thereof; and a cover 22 surrounding the retainer pots 23 and the retainer disk plate 24.

As shown in FIG. 4, the tool changer mechanism 26 includes: a rotation shaft 27 provided parallel to the spindle 16 (see FIG. 3); a changer arm 28 fixed to a lower end of the rotation shaft 27 and having tool holding portions 28a provided at opposite ends thereof; roller-shaped cam followers 33 provided around an outer circumference of a middle portion of the rotation shaft 27 at a predetermined angular interval for rotating the rotation shaft 27 about an axis thereof; a lever-shaped cam follower 34 provided in engagement with the rotation shaft 27 below the cam followers 33 for moving the rotation shaft 27 along the axis thereof; a roller gear cam 35 having guide grooves formed in an outer circumference thereof for engagement with the cam followers 33, and a guide groove formed in a side face thereof for engagement with the cam follower 34; a gear 41 integrally fixed to the roller gear cam 35; and a motor 36 for generating a rotative driving force which is transmitted to the gear 41 via transmission gears 38, 39 and the like. The cam followers 33 each include an engagement roller rotatably supported by a bearing for engagement with the guide groove formed in the outer circumference of the roller gear cam 35. The cam follower 34 includes an engagement roller rotatably supported by a bearing for engagement with the guide groove formed on the side face of the roller gear cam 35.

With this arrangement, the rotative driving force is transmitted from the motor 36 to the roller gear cam 35 via the gears 38, 39, 41 to rotate the roller gear cam 35 about the axis thereof, whereby the rotation shaft 27 is rotated about the axis thereof by the action of the cam followers 33 engaged with the roller gear cam 35 and is axially moved by the action of the cam follower 34 engaged with the roller gear cam 35. The action of the rotation shaft 27 causes the changer arm 28 to perform a tool changing operation which will be described later.

As shown in FIG. 5, the numerical controller 50 includes a computerized numerical controller (CNC) 54, a programmable logic controller (PLC) 55, an input/output interface 56 and the like, and is connected to an external control circuit 51 via the input/output interface 56. The control circuit 51 is connected to an operation panel 52, the tool changer mechanism 26 and the like.

The CNC 54 executes a machining program stored therein to control basic operations of the machine tool 12 such as axial movements of the spindle head 15 and the table 17, and display of a CRT 11. The PLC 55 includes a changer controlling section 57 and the like, and controls auxiliary operations of the machine tool 12 such as operations of the tool magazine 21 and the tool changer mechanism 26. The CRT 11 typically displays the machining program and the coordinates of the current position of a tool.

As described above, the changer controlling section 57 controls the operation of the tool changer mechanism 26 via the control circuit 51. The changer controlling section 57 usually drives the tool changer mechanism 26 to perform the tool changing operation in response to a tool changing command from the CNC 54 executing the machining program. The tool changing command can also be manually inputted from the operation panel 52 to cause the tool changer mechanism 26 to perform the tool changing operation. In this case, the tool changing command inputted from the operation panel 52 is transmitted to the CNC 54 via the control circuit 51, the input/output interface 56 and the PLC 55. Then, the tool changing command is output ted to the changer controlling section 57 from the CNC 54. Upon reception of the tool changing command, the changer controlling section 57 drives the tool changer mechanism 26 for the tool changing operation.

The automatic tool changer is constituted by the tool changer mechanism 26, the changer controlling section 57 and the like. The tool T attached to the spindle 16 is automatically exchanged with another tool in the following manner by the automatic tool changer.

First, a retainer pot 23 which retains a desired tool holder TH on the tool magazine 21 is moved to a changing position thereby to be ready for tool exchange. Then, the cam followers 33 rotate the rotation shaft 27 by 90 degrees about the axis thereof in a normal rotation direction. The changer arm 28 is rotated together with the rotation shaft 27 by 90 degrees, whereby the tool holder TH attached to the spindle 16 (hereinafter referred to as "current tool holder") and the tool holder TH in the retainer pot 23 (hereinafter referred to as "next tool holder") are respectively held by the tool holding portions 28a provided at the opposite ends of the changer arm 28.

In turn, the cam follower 34 advances the rotation shaft 27 along the axis thereof, whereby the current tool holder TH and the next tool holder TH held by the changer arm 28 are respectively removed from the spindle 16 and the retainer pot 23. Thereafter, the cam followers 33 further rotate the rotation shaft 27 by 180 degrees in the normal rotation direction, and the cam follower 34 retracts the rotation shaft 27 along the axis thereof. Thus, the next tool holder TH is attached to the spindle 16, and the current tool holder TH is retained in the retainer pot 23.

The cam followers 33 rotate the rotation shaft 27 by 90 degrees in a reverse direction to return the rotation shaft 27 to an original position. Then, the retainer pot 23 is transported to the previous indexing position, and stored within the cover 22. Thus, the current tool holder TH attached to the spindle 16 is exchanged with the next tool holder TH stored in the tool magazine 21.

As described above, the cam followers 33, 34 each employ the bearing, which naturally has a limited service durability due to the wear and the like of rolls thereof and, hence, has a finite service life. However, the conventional automatic tool changer is not adapted to detect the end of the service life of the bearings. Therefore, the service life of the bearings of the cam followers 33, 34 may end during the operation of the automatic tool changer, resulting in breakage of the bearings. Depending on operating conditions of the cam followers 33, 34, the time required for recovery from the breakage is disadvantageously prolonged.

Where the bearings of the cam followers 33, 34 are broken, there is a danger of breakage of other components depending on the conditions of the breakage of the bearings. The breakage of a greater number of components prolongs the time required for repair of the components. This disadvantageously reduces the availability of the machine tool. If there is no spare bearing, the tool changer cannot be repaired until a new bearing is delivered. This further reduces the availability of the machine tool.

In view of the foregoing, it is an object of the present invention to provide an automatic tool changer which is adapted to detect the end of the service life of the bearings of the cam followers for systematic replacement of the bearings.

SUMMARY OF THE INVENTION

In accordance with the present invention to achieve the aforesaid object, there is provided an automatic tool changer, which comprises: a tool changer mechanism including a rotatably supported rotation shaft, a changer arm fixed to the rotation shaft, a cam follower having an engagement roller rotatably supported by a bearing for engagement with the rotation shaft, a cam having an engagement groove for engagement with the engagement roller of the cam follower, and driving means for driving the cam to move the rotation shaft along an axis thereof and/or rotate the rotation shaft about the axis thereof via the cam follower engaged with the cam; a controlling section for controlling the tool changer mechanism for a tool changing operation; and a service life end detecting section for counting the number of times of the tool changing operation performed by the tool changer mechanism and, when the count of the number reaches a predetermined reference operation number, judging that the service life of the bearing of the cam follower ends.

In the automatic tool changer according to the present invention, the service life end detecting section counts the number of the times of the tool changing operation and, when the count of the number reaches the predetermined reference operation number, judges that the service life of the bearing of the cam follower ends.

Assuming that the bearing is operated under a constant load, the end of the service life of the bearing is typically detected on the basis of a cumulative operation time. If the load exerted on the bearing of the cam follower is known (which may be determined as a design-based theoretical load), the theoretical operation time to be elapsed until the end of the service life of the bearing can be determined through calculation. The time required for each tool changing operation is constant, and can easily be measured. Further, the operation time of the bearing in the tool changing operation can experimentally or theoretically be determined.

Therefore, the cumulative operation time of the bearing can be calculated by counting the number of the times of the tool changing operation, so that the end of the service life of the bearing can be detected on the basis of the cumulative operation time thus calculated. In the present invention, the number of times that the tool changing operation is expected to be performed before the end of the service life of the bearing is calculated as the reference operation number by dividing the preliminarily calculated service life period by the operation time of the bearing for each tool changing operation. The number of the times of the tool changing operation is counted and, when the count of the number reaches the reference operation number, it is judged that the service life of the bearing ends.

Since the end of the service life of the bearing can be thus detected by the service life end detecting section in accordance with the present invention, maintenance can systematically be carried out by preparing a spare bearing and replacing the bearing with the spare bearing before the end of the service life of the bearing. The availability of the machine tool can further be improved by performing the maintenance operation during an idle period of the machine tool in accordance with an operation plan of the machine tool. Therefore, the reduction in the availability of the machine tool can be prevented, because the breakage of the bearing due to the end of the service life thereof during the operation of the automatic tool changer can be prevented which may otherwise require a prolonged time for the recovery from the breakage.

In the automatic tool changer of the present invention, the tool changer mechanism is adapted to perform the tool changing operation in a different manner depending on the diameter of the tool to be changed, and the service life end detecting section is adapted to weight an increment of the count of the number in accordance with the time required for the tool changing operation.

In some machine tools, the tool changing operation is performed in a different manner depending on the tool diameter. Where tools having different diameters (e.g., a small-diameter tool and a large-diameter tool) are to be exchanged with each other, for example, a current tool attached to the spindle is first returned to the tool magazine, and then a next tool on the tool magazine is attached to the spindle. Therefore, the tool changer mechanism is actuated twice for the tool changing operation. Where tools having the same diameter (e.g., small-diameter tools or large-diameter tools) are to be exchanged with each other, on the contrary, the tool changer mechanism is actuated once for the tool changing operation.

In such a case, the end of the service life cannot accurately be detected by the simple comparison between the count of the number of the times of the tool changing operation and the reference operation number, because the wear of the bearing occurring during the exchange of the tools of the different diameters is twice as great as that occurring during the exchange of the tools of the same diameters. Therefore, the increment of the count of the number is weighted in accordance with the time required for the tool changing operation. More specifically, where the tool changing operation is performed for the exchange of the tools of the different diameters, the count of the number is incremented by two. Where the tool changing operation is performed for the exchange of the tools of the same diameter, the count of the number is incremented by one. Thus, the degree of the wear of the bearing which differs depending on the tool changing operation can accurately be reflected on the detection of the end of the service life of the bearing. Therefore, the end of the service life can accurately be detected.

The automatic tool changer according to the present invention further comprises display means for graphically displaying the ratio of the count of the number to the reference operation number.

With this arrangement, the ratio of the count of the number to the reference operation number is graphically displayed by the display means. Thus, an operator can recognize the degree of the wear of the bearing at a glance. Through daily monitoring of the degree of the wear of the bearing, the end of the service life of the bearing can easily be predicted, so that a maintenance plan can easily be formulated.

DESCRIPTION OF THE PREFERRED EMBODIMENT

Figure 1:
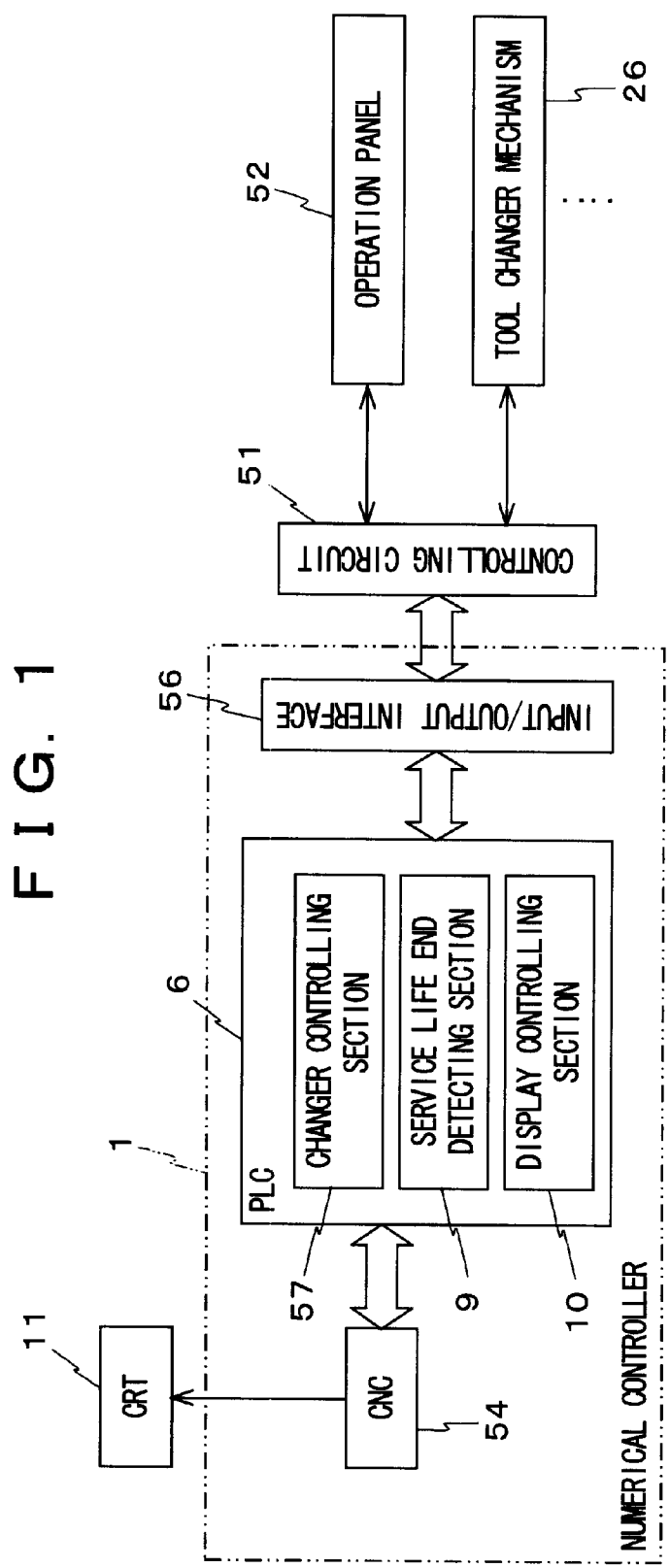
FIG. 1 is a block diagram illustrating a numerical controller and the like of a machine tool according to one embodiment of the present invention.
Figure 2:
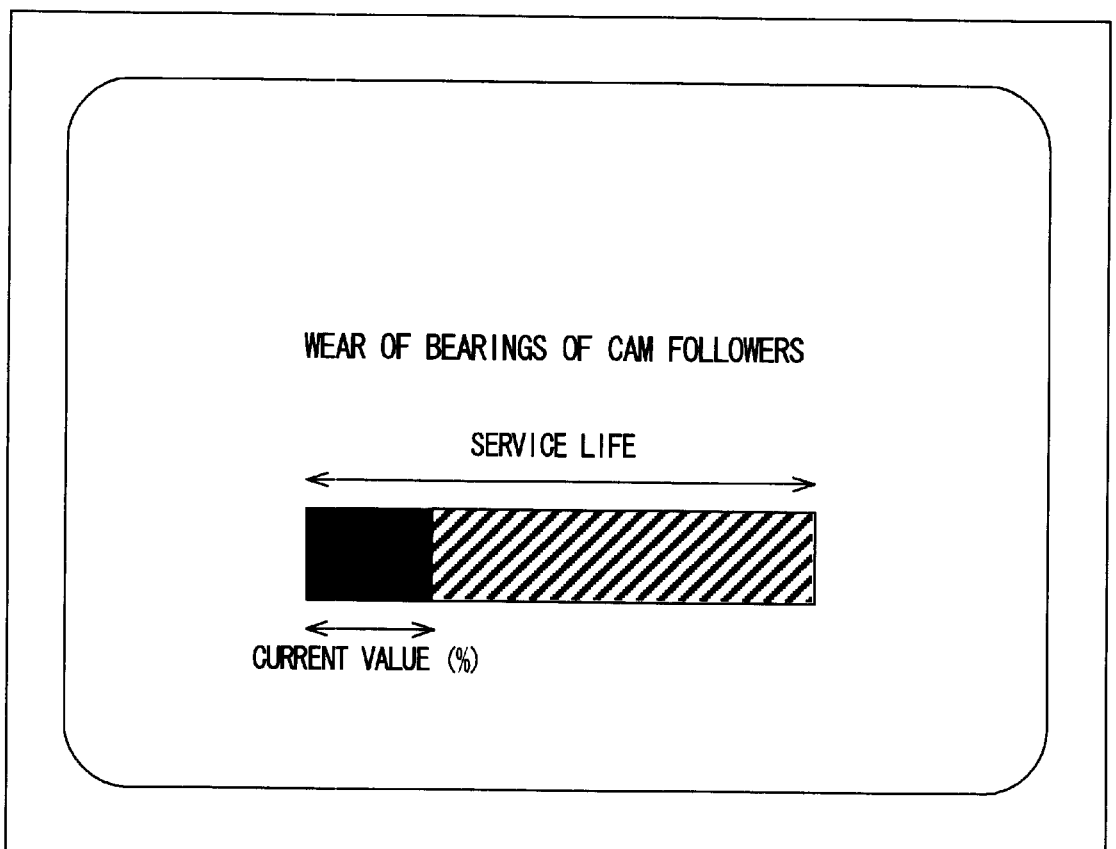
FIG. 2 is a diagram illustrating one exemplary display screen to be displayed on a CRT in accordance with the embodiment.
Figure 3:
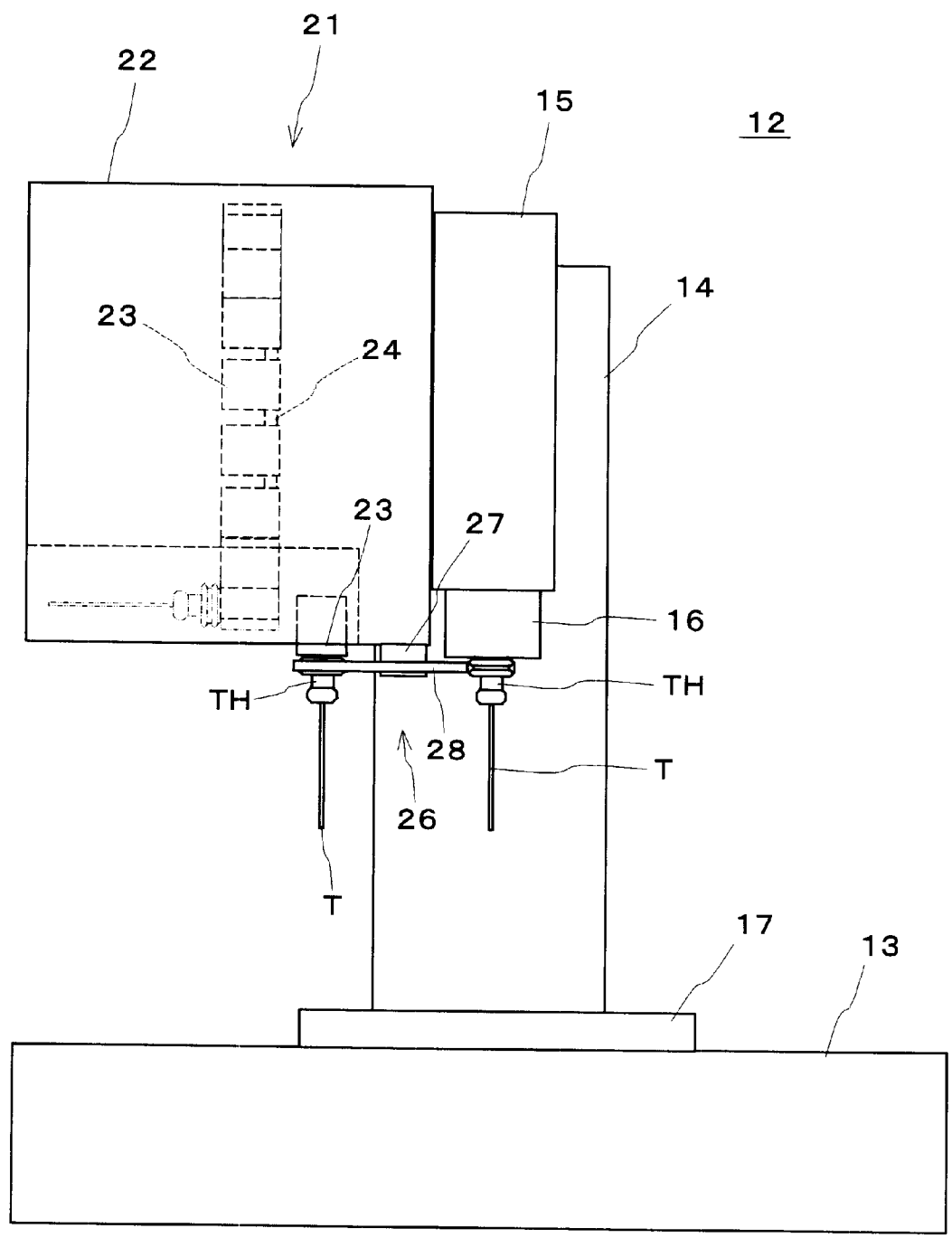
FIG. 3 is a front view illustrating a conventional machine tool as a whole.
Figure 4:
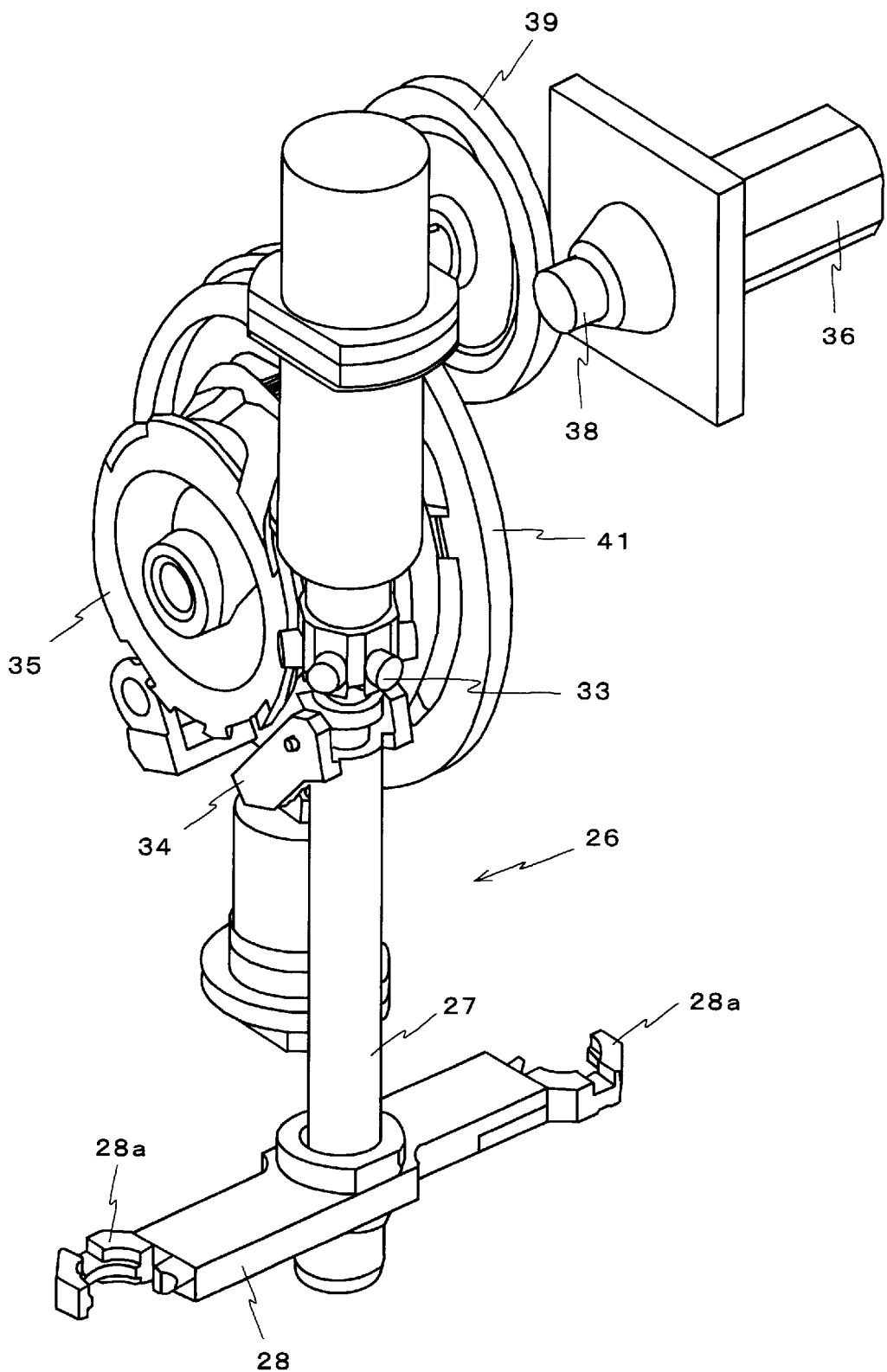
FIG. 4 is a perspective view illustrating in detail a tool changer mechanism shown in FIG. 3.
Figure 5:
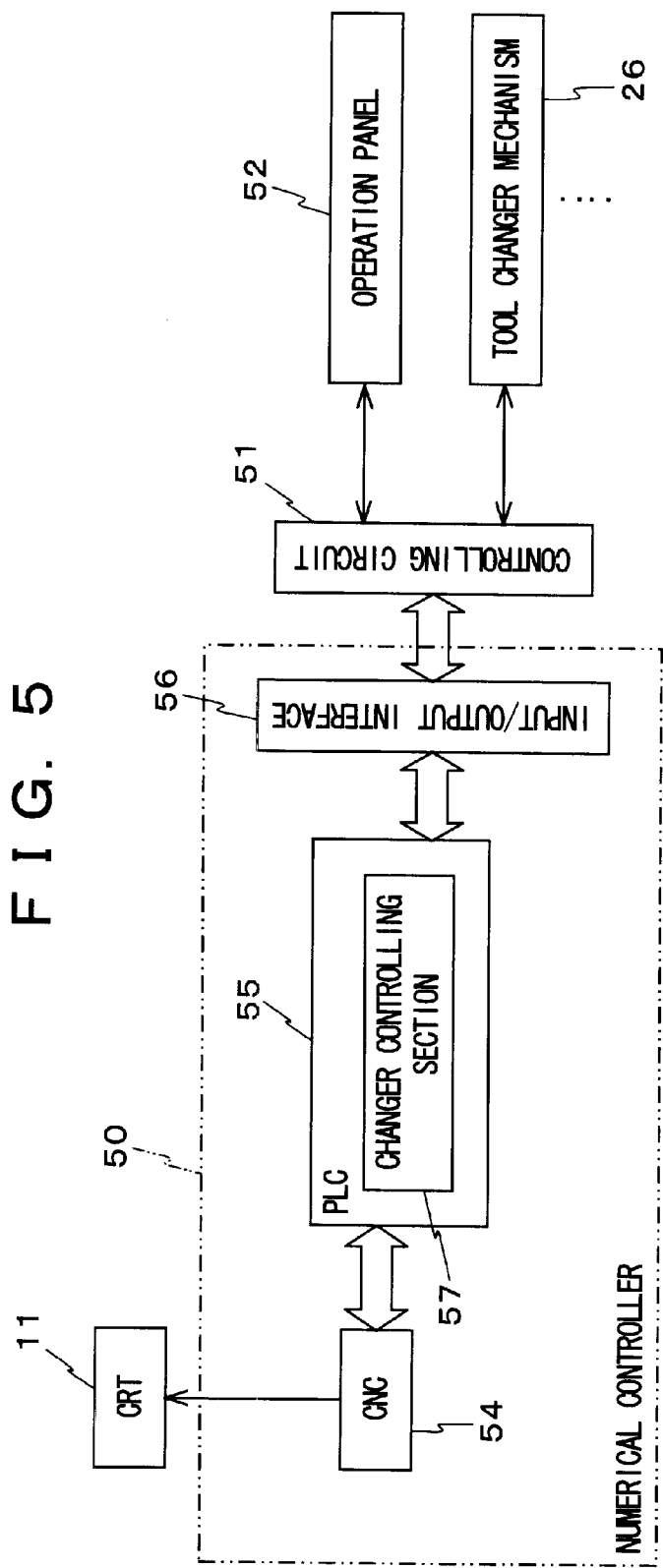
FIG. 5 is a block diagram illustrating a numerical controller of the conventional machine tool.

A machine tool having an automatic tool changer according to an embodiment of the present invention will hereinafter be described in detail with reference to the attached drawings. FIG. 1 is a block diagram illustrating a numerical controller and the like of the machine tool according to this embodiment, and FIG. 2 is a diagram illustrating one exemplary display screen to be displayed on a CRT. The machine tool according to this embodiment is a modification of the conventional machine tool having the automatic tool changer shown in FIGS. 3 to 5, and is different from the conventional machine tool in that the numerical controller has a different construction. Therefore, components equivalent to those of the conventional machine tool shown in FIGS. 3 to 5 will not be explained in detail, and will be denoted by like reference characters in FIGS. 1 and 2.

As shown in FIG. 1, the numerical controller 1 according to this embodiment includes a PLC 6 which has a different construction from the conventional PLC 55 in that the PLC 6 has additional functions and further includes a display controlling section 10 and a service life end detecting section 9.

The service life end detecting section 9 counts the number of times of a tool changing operation performed by the tool changer mechanism 26. More specifically, the service life end detecting section 9 increments the count of the number by one whenever receiving a tool changing command from the CNC 54, and compares the count of the number with a predetermined reference value to judge whether or not the count of the number reaches the reference value. The count of the number and the reference value and, if it is judged that the count of the number reaches the reference value, a signal indicative of the judgment (service life end detection signal) are outputted to the display controlling section 10.

The reference value herein means the number of times that the tool changing operation is expected to be performed before the end of the service life of the bearings of the cam followers 33, 34. The reference value is determined in the following manner, and stored in the service life end detecting section 9.

First, an operation time (service life period) L to be elapsed until the end of the service life of each of the bearings of the cam followers 33, 34 is calculated from the following equation:

$$L=(a \times C)/(F \times N^{0.3})$$

wherein a is a constant, C is a load rating (constant) of the bearing, F is a load exerted on the bearing, and N is the number of revolutions of the bearing.

Then, an operation time of each of the bearings for each tool changing operation is experimentally or theoretically determined. The service life period calculated from the aforesaid equation is divided by the operation time of the bearing for each tool changing operation. Thus, the number of the times that the tool changing operation is expected to be performed before the end of the service life is determined for each of the bearings. The smallest one of the numbers thus determined for the respective bearings is employed as the reference value.

The display controlling section 10 receives the count of the number and the reference value from the service life end detecting section 9, and controls the CRT 11 via the CNC 54 to graphically display the ratio of the count of the number to the reference value as shown in FIG. 2. Further, the display controlling section 10 causes the CRT 11 to display a message requesting the replacement of the bearings upon reception of the service life end detection signal. In a display screen shown in FIG. 2, the reference value is displayed as SERVICE LIFE and the count of the number is displayed as CURRENT VALUE (%). Therefore, an operator can recognize the degree of the wear of the bearing at a glance.

In the numerical controller 1 of the machine tool having the automatic tool changer in accordance with this embodiment, the service life end detecting section 9 increments the count of the number by one whenever receiving the tool changing command applied from the CNC 54 to the PLC 6 during the execution of a machining program or by a manual operation. Then, the service life end detecting section 9 compares the count of the number with the predetermined reference value to judge whether or not the count of the number reaches the reference value.

If the service life end detecting section 9 judges that the count of the number reaches the reference value, the message requesting the replacement of the bearings is displayed on the CRT 11. Further, the ratio of the count of the number to the reference value is graphically displayed on the CRT 11 as shown in FIG. 2, so that the operator can recognize the degree of the wear of the bearings at a glance.

According to this embodiment, the end of the service life of the bearings is detected by the service life end detecting section 9. Therefore, maintenance can systematically be carried out by preparing spare bearings and replacing the bearings with the spare bearings before the end of the service life of the bearings. The availability of the machine tool can further be improved by performing the maintenance operation during an idle period of the machine tool in accordance with an operation plan of the machine tool. Since the degree of the wear of the bearings is displayed on the CRT 11, the end of the service life of the bearings can easily be predicted through daily monitoring of the degree of the wear of the bearings. Therefore, a maintenance plan can easily be formulated.

In this embodiment, the end of the service life of the bearings is indicated by displaying the message requesting the replacement of the bearings on the CRT 11, but may be indicated by lighting an alarm lamp or beeping an alarm beeper.

In some machine tools, the tool changing operation is performed in a different manner depending on a tool diameter. Where tools having different diameters (e.g., a small-diameter tool and a large-diameter tool) are to be exchanged with each other, for example, a current tool T attached to the spindle 16 is returned to the tool magazine 21, and then a next tool T on the tool magazine 21 is attached to the spindle 16. Therefore, the tool changer mechanism 26 is actuated twice for the tool changing operation. Where tools having the same diameter (e.g., small-diameter tools or large-diameter tools) are to be exchanged with each other, on the contrary, the tool changer mechanism 26 is actuated once for the tool changing operation.

In such a case, the end of the service life cannot accurately be detected by the simple comparison between the count of the number of the times of the tool changing operation and the reference value, because the wear of the bearings occurring during the exchange of the tools of the different diameters is twice as great as that occurring during the exchange of the tools of the same diameters.

Therefore, the service life end detecting section 9 weights an increment of the count of the number in accordance with the time required for the tool changing operation. More specifically, where the tool changing operation is performed for the exchange of the tools of the different diameters, the count of the number is incremented by two. Where the tool changing operation is performed for the exchange of the tools of the same diameter, the count of the number is incremented by one. Thus, the degree of the wear of the bearings which differs depending on the tool changing operation can accurately be reflected on the detection of the end of the service life of the bearings. Therefore, the end of the service life can accurately be detected.

What is claimed is:

1. An automatic tool changer comprising:

a tool changer mechanism including a rotatably supported rotation shaft, a changer arm fixed to the rotation shaft, a cam follower having an engagement roller rotatably supported by a bearing for engagement with the rotation shaft, a cam having an engagement groove for engagement with the engagement roller of the cam follower, and driving means for driving the cam to move the rotation shaft along an axis thereof and rotate the rotation shaft about the axis thereof via the cam follower engaged with the cam;

a controlling section for controlling the tool changer mechanism for a tool changing operation; and a service life end detecting section for counting a number of times of the tool changing operation performed by the tool changer mechanism and, when a count of the number reaches a predetermined reference operation number, judging that a service life of the bearing of the cam follower ends.

2. An automatic tool changer as set forth in claim 1, wherein the tool changer mechanism is adapted to perform the tool changing operation in a different manner depending on a diameter of a tool to be changed, wherein the service life end detecting section is adapted to weight an increment of the count of the number in accordance with a time required for the tool changing operation.

3. An automatic tool changer as set forth in claim 1 or 2, further comprising display means for graphically displaying a ratio of the count of the number to the reference operation number.

* * * * *